United States Patent
Pu et al.

(10) Patent No.: US 11,991,479 B2
(45) Date of Patent: May 21, 2024

(54) TIME-LAPSE PHOTOGRAPHIC DEVICE

(71) Applicant: ASUSTEK COMPUTER INC., Taipei (TW)

(72) Inventors: Hsin-Yi Pu, Taipei (TW); Kai-Yu Hsu, Taipei (TW); Lai-Peng Wong, Taipei (TW); Chieh Li, Taipei (TW); Ting-Han Chang, Taipei (TW); Ching-Xsuan Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 62 days.

(21) Appl. No.: 17/672,238

(22) Filed: Feb. 15, 2022

(65) Prior Publication Data

US 2022/0321846 A1 Oct. 6, 2022

(30) Foreign Application Priority Data

Apr. 6, 2021 (TW) .................................. 110112276

(51) Int. Cl.
*H04N 7/18* (2006.01)
*H04N 23/69* (2023.01)
*H04N 23/695* (2023.01)

(52) U.S. Cl.
CPC ............. *H04N 7/188* (2013.01); *H04N 23/69* (2023.01); *H04N 23/695* (2023.01)

(58) Field of Classification Search
CPC ...... H04N 23/69; H04N 23/695; H04N 23/58; H04N 23/631
See application file for complete search history.

(56) References Cited

U.S. PATENT DOCUMENTS

| 9,230,250 | B1* | 1/2016 | Parker ................ G06Q 30/0185 |
| 10,368,003 | B2 | 7/2019 | Hayashi et al. |
| 2012/0320151 | A1* | 12/2012 | Unger .................. H04N 23/698 348/37 |
| 2016/0269648 | A1* | 9/2016 | Hayashi ................... H04N 5/91 |

(Continued)

FOREIGN PATENT DOCUMENTS

| CN | 105915802 A | 8/2016 |
| CN | 107018329 A | 8/2017 |

(Continued)

*Primary Examiner* — Christopher K Peterson
(74) *Attorney, Agent, or Firm* — MUNCY, GEISSLER, OLDS & LOWE, P.C.

(57) ABSTRACT

The disclosure provides a time-lapse photographic device. The time-lapse photographic device includes a camera module, a drive module, an environment detection module, and a control unit. The drive module is connected to the camera module to drive the camera module to rotate. The environment detection module is configured to detect an external environment of the time-lapse photographic device to generate an environment detection signal. The control unit is electrically connected to the camera module, the drive module, and the environment detection module. The control unit generates, according to a shooting stop parameter, a plurality of intermittent drive signals to control the drive module, and controls the camera module to shoot at intervals of the drive signals. The control unit adjusts operation of at least one of the camera module and the drive module according to the environment detection signal.

8 Claims, 4 Drawing Sheets

(56) References Cited

U.S. PATENT DOCUMENTS

2017/0359507 A1 12/2017 Lee et al.
2018/0113462 A1 4/2018 Fenn et al.

FOREIGN PATENT DOCUMENTS

| CN | 104917960 B | 10/2017 |
| CN | 105849635 B | 7/2018 |
| CN | 110233919 A | 9/2019 |
| CN | 110771137 A | 2/2020 |
| CN | 111458958 A | 7/2020 |

\* cited by examiner

TIME-LAPSE PHOTOGRAPHIC DEVICE

CROSS-REFERENCE TO RELATED APPLICATION

This application claims the priority benefit of Taiwan application serial No. 110112276, filed on Apr. 6, 2021. The entirety of the above-mentioned patent application is hereby incorporated by reference herein and made a part of the specification.

BACKGROUND OF THE INVENTION

Field of the Invention

The disclosure relates to an electronic device with a photographic function, and in particular, to a time-lapse photographic device.

Description of the Related Art

Time-lapse photography is a photographic technique in which the frequency at which frames are shot is much lower than the frequency normally required to view continuous frames. A subtle process that human eyes capture, such as the movement of the sun or stars in the sky, is clearly and completely presented by time-lapse photography.

Existing portable electronic devices, such as smartphones, only shoot time-lapse videos with a fixed viewing angle, but do not shoot time-lapse videos with a sense of speed.

BRIEF SUMMARY OF THE INVENTION

The disclosure provides a time-lapse photographic device. The time-lapse photographic device includes a camera module, a drive module, an environment detection module, and a control unit. The drive module is connected to the camera module to drive the camera module to rotate. The environment detection module is configured to detect an external environment of the time-lapse photographic device to generate an environment detection signal.

The control unit is electrically connected to the camera module, the drive module, and the environment detection module. The control unit generates, according to a shooting stop parameter, a plurality of intermittent drive signals to control the drive module, and controls the camera module to shoot at intervals of the drive signals. The control unit adjusts operation of at least one of the camera module and the drive module according to the environment detection signal.

The time-lapse photographic device provided in the disclosure controls the camera module to rotate, and controls the camera module to shoot in a timely manner. In this way, the interestingness of the photographic content is improved by changing an angle of view of the time-lapse video, and the quality of the time-lapse video is improved.

DETAILED DESCRIPTION OF THE EMBODIMENTS

More detailed descriptions of the specific embodiments of the disclosure are provided below with reference to the accompanying drawings. The features and advantages of the disclosure are described more clearly according to the following description and claims. It should be noted that all of the drawings use very simplified forms and imprecise proportions, only being used for assisting in conveniently and clearly explaining the objective of the embodiments of the disclosure.

Figure 1:
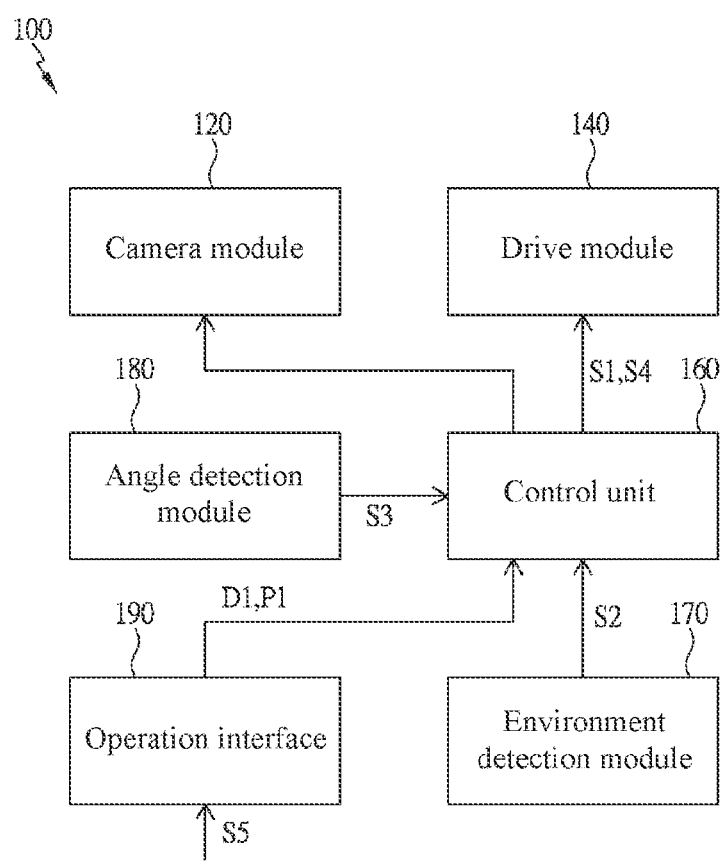
FIG. 1 is a schematic block diagram of an embodiment of a time-lapse photographic device according to the disclosure.

FIG. 1 is a schematic block diagram of an embodiment of a time-lapse photographic device according to the disclosure. As shown in FIG. 1, the time-lapse photographic device 100 provided in the disclosure includes a camera module 120, a drive module 140, and a control unit 160.

The drive module 140 is connected to the camera module 120 to drive the camera module 120 to rotate. In an embodiment, the drive module 140 includes a motor (not shown in the figure), and the motor drives the camera module 120 to rotate according to a drive signal S1.

In an embodiment, the camera module 120 includes a photosensitive element and a lens element. An external image is projected on the photosensitive element through the lens element, to generate an image signal. The camera module 120 is provided with a plurality of lens elements and a plurality of corresponding photosensitive elements according to actual requirements, to provide different camera effects such as high resolution, macro, wide angle, and telephoto The control unit 160 is electrically connected to the drive module 140 and the camera module 120. The control unit 160 generates intermittent drive signals S1 to the drive module 140 according to a shooting stop parameter P1, and the drive module 140 drives the camera module 120 to rotate according to the drive signal S1.

In an embodiment, the intermittent drive signals S1 may be periodic. In addition, the control unit 160 also controls the camera module 120 to shoot at intervals of the drive signals S1, that is, controls the camera module 120 to shoot when the camera module 120 is stationary.

In an embodiment, the shooting stop parameter P1 includes a preset rotational speed value, such as 2 degrees in 10 seconds. According to the preset rotational speed value, the control unit 160 first outputs the drive signal S1 to make the drive module 140 rotate to a required angle (rotate from the previous angular position by 2 degrees) in a short period of time, and then stops outputting the drive signal S1 to make the camera module 120 maintain at this angular position.

In an embodiment, the time-lapse photographic device 100 includes an environment detection module 170. The environment detection module 170 is configured to detect an external environment to generate an environment detection signal S2. The control unit 160 is electrically connected to the environment detection module 170, and adjusts operation of the drive module 140 and/or the camera module 120 according to the environment detection signal S2.

The environment detection signal S2 is an environment brightness signal or a vibration signal. Using the environment brightness signal as an example, when the environment detection signal S2 detects that the time-lapse photographic device 100 is in a high-contrast or dark environment, the control unit 160 adjusts the intervals of the drive signals S1 according to the environment detection signal S2 and prolongs a shooting time of the camera module 120 to shoot a time-lapse video with a longer exposure time, thereby ensuring completeness of details of the video.

Using the vibration signal as an example, when the environment detection signal detects an obvious vibration of the time-lapse photographic device 100, the control unit 160 controls the camera module 120 to suspend photography according to the environment detection signal S2, so as to avoid image blur caused by the environment vibration.

In an embodiment, the time-lapse photographic device 100 includes an angle detection module 180, configured to detect a rotation angle of the camera module 120 to generate an angle detection signal S3. The control unit 160 is electrically connected to the angle detection module 180, and controls the drive module 140 to correct the rotation angle of the camera module 120 according to the angle detection signal S3.

In an embodiment, the angle detection module 180 detects the rotation angle of the camera module 120 in an optical manner.

In an embodiment, the control unit 160 corrects the rotation angle of the camera module 120 in real time according to the angle detection signal S3, that is, the control unit 160 detects an actual rotation angle of the camera module 120 by the angle detection module 180 each time after the control unit 160 generates the drive signal S1 to make the drive module 140 drive the camera module 120 to rotate.

The control unit 160 compares the actual rotation angle corresponding to the angle detection signal S3 with a rotation angle set by the shooting stop parameter P1, determines a required correction value (that is, a difference between the actual rotation angle corresponding to the angle detection signal S3 and the rotation angle set by the shooting stop parameter P1), and corrects the rotation angle of the camera module 120 in real time according to the correction value.

In an embodiment, the control unit 160 generates a correction signal S4 according to the correction value, and the drive module 140 drives the camera module 120 to rotate according to the correction signal S4. During the rotation of the camera module 120, the control unit 160 controls the camera module 120 to stop shooting until confirming that the correction of the rotation angle of the camera module 120 is finished, that is, the camera unit 160 does not control the camera module 120 to start shooting until the camera module 120 rotates to the rotation angle set by the shooting stop parameter, thereby ensuring the shooting quality of time-lapse photography.

In an embodiment, assuming that the rotational speed value defined by the shooting stop parameter P1 is 2 degrees in 10 seconds, the drive module 140 drives, according to the drive signal S1, the camera module 120 to rotate to a fixed position within a short period of time (such as 1 second).

In this case, when the actual rotation angle detected by the angle detection module 180 is 1 degree, the control unit 160 calculates a correction value of 1 degree, generates a correction signal S4 according to the correction value, and uses the intervals of the drive signals S1 to control the drive module 140 to drive the camera module 120 to rotate by another 1 degree.

In an embodiment, the control unit 160 adjusts the intervals of the drive signals S1 to correct the rotation angle of the camera module 120 according to the angle detection signal S3. The control unit 160 compares the actual rotation angle corresponding to the angle detection signal S3 with the rotation angle set by the shooting stop parameter P1, determines a required correction value, and adjusts a starting time of the next drive signal S1 according to the correction value.

In an embodiment, assuming that the rotational speed value defined by the shooting stop parameter P1 is 2 degrees in 10 seconds, the drive module 140 drives, according to the drive signal S1, the camera module 120 to rotate to a fixed position within a short period of time (such as 1 second).

In this case, when the actual rotation angle detected by the angle detection module 180 is 1 degree, the control unit 160 calculates a correction value of 1 degree, and adjusts a generation time of the next drive signal S1 (that is, adjusts the interval between the current drive signal S1 and the next drive signal S1) according to the correction value. In an embodiment, the generation time is reduced to 5 seconds from 10 seconds. In this way, the drive module 140 drives the camera module 120 to rotate in advance to compensate for the difference in the rotation angle.

In an embodiment, the time-lapse photographic device 100 includes an operation interface 190. The operation interface 190 receives an external input signal S5 to set corresponding control information D1 (such as rotation direction information, starting angle information, or zoom information) and a shooting stop parameter P1, and provides the control information D1 to the control unit 160.

The control unit 160 controls the operation of the drive module 140 and the camera module 120 according to the control information D1. In an embodiment, during a shooting process of the camera module 120, the control unit 160 controls the drive module 140 to drive the camera module 120 to rotate according to the rotation direction information. The rotation direction information defines a rotation direction rule, such as first downward or first upward, first clockwise or first anticlockwise, or whether to rotate back and forth.

Before the camera module 120 starts shooting, the control unit 160 first controls, according to the starting angle information, the drive module 140 to drive the camera module 120 to a starting angle corresponding to the starting angle information, and then starts to shoot the time-lapse video. During the shooting process of the camera module 120, the control unit 160 adjusts a field of view of the camera module 120 according to the zoom information. The zoom information defines a zoom rule, such as gradually enlarging the field of view or gradually reducing the field of view.

In an embodiment, the operation interface 190 is displayed on a touchscreen, and the external input signal S5 is received through the touchscreen. However, this is not limited thereto. In other embodiments, the operation interface 190 is also displayed on a general screen, and is matched with an input device such as a touch panel or a key module to receive the external input signal S5. In other embodiments, the operation interface 190 is alternatively a voice control interface.

Figure 2:
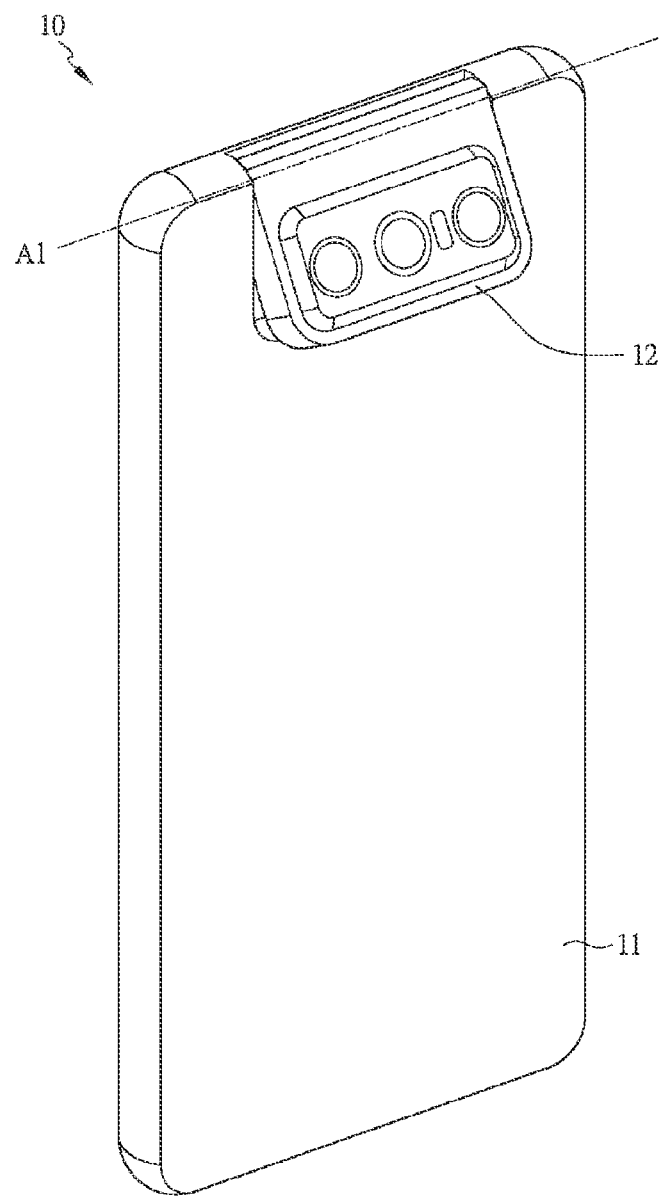
FIG. 2 is a schematic three-dimensional diagram of an embodiment of the time-lapse photographic device according to the disclosure.

FIG. 2 is a schematic three-dimensional diagram of an embodiment of the time-lapse photographic device according to the disclosure. A smartphone is used as an example in the figure.

As shown in the figure, the smartphone 10 includes a camera module 12 disposed on an upper edge of a main body 11 of the smartphone 10. The camera module 12 is rotatably connected to the main body 11 of the smartphone 10. A drive module (not shown in the figure and hidden in the main body 11) connected to the camera module 12 is disposed near the upper edge of the main body 11, to drive the camera module 12 to rotate along an axial direction A1.

In an embodiment, the camera module 12 rotates back and forth toward front and back surfaces of the smartphone 10 along an axial direction.

Figure 3:
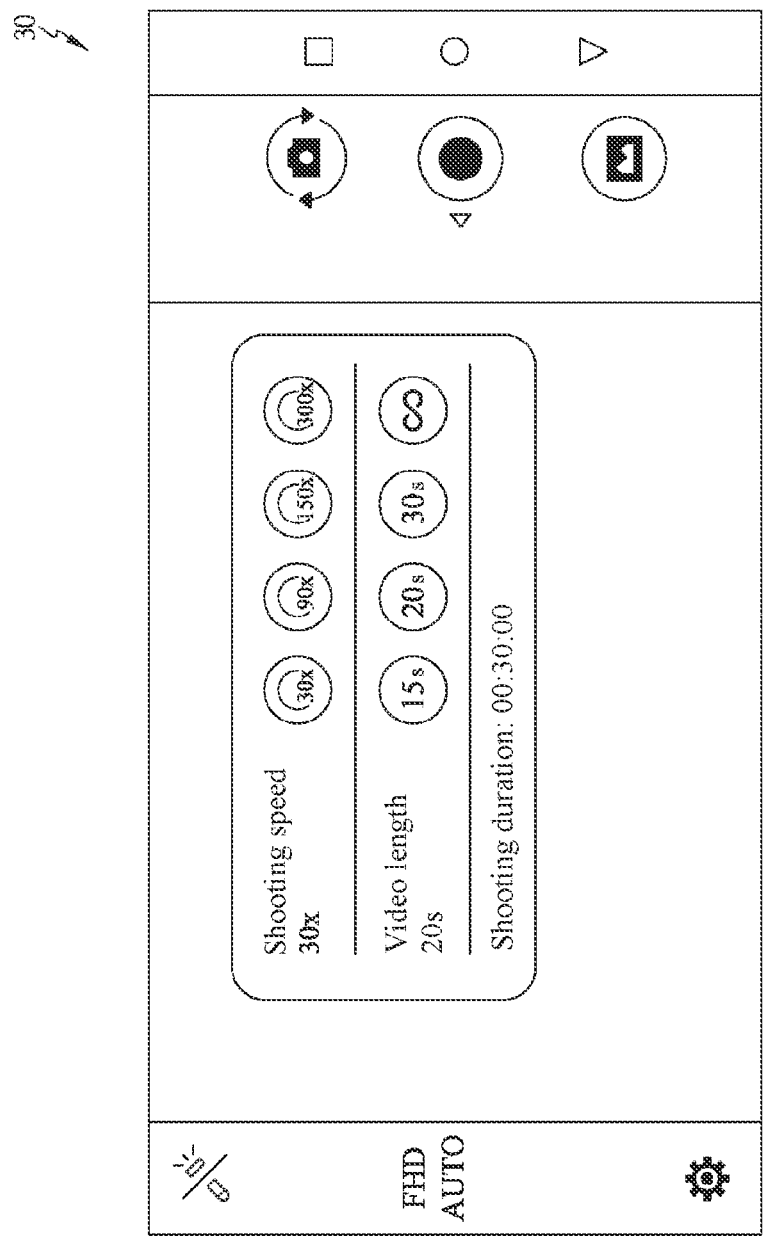
FIG. 3 is a schematic diagram of an embodiment of an operation interface of the time-lapse photographic device according to the disclosure.

FIG. 3 is a schematic diagram of an embodiment of the operation interface of the time-lapse photographic device according to the disclosure. An operation interface 30 in the figure is displayed on a touchscreen for a user to control by touch.

As shown in the figure, a plurality of shooting speeds (that is, 30×, 60×, 90×, and 300× in the figure) and video times (that is, 15 s, 20 s, 30 s, and infinite in the figure) is defined in the operation interface 30 in advance for the user to select. The user sets a required shooting speed and video time through the operation interface 30. The control unit 160 controls the operation of the camera module 120 and the drive module 140 according to the shooting speed and the video time.

Figure 4:
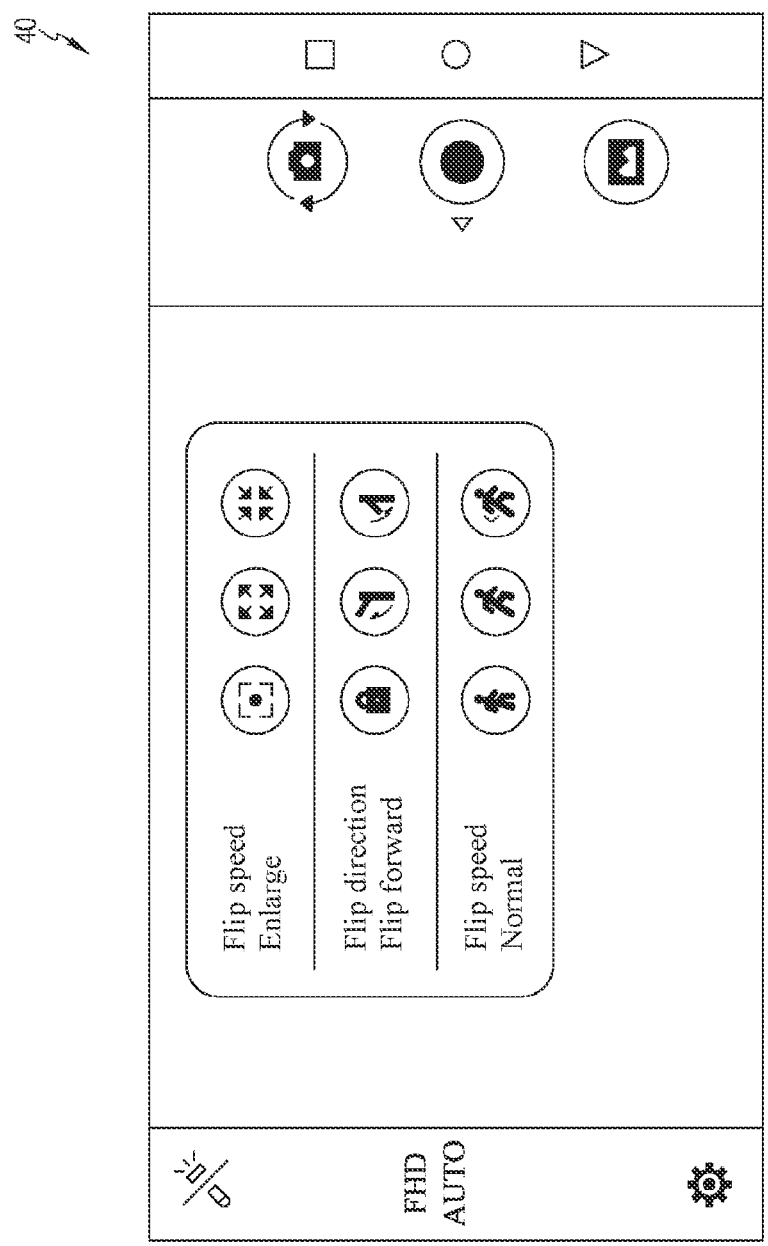
FIG. 4 is a schematic diagram of another embodiment of the operation interface of the time-lapse photographic device according to the disclosure.

FIG. 4 is a schematic diagram of another embodiment of the operation interface of the time-lapse photographic device according to the disclosure. An operation interface 40 in the figure is displayed on a touchscreen for the user to control by touch.

As shown in the figure, various options for the zoom information (corresponding to auto zoom in the figure), options for the rotation direction information, and options for the shooting stop parameter P1 (corresponding to the flip speed in the figure) are defined in the operation interface 40 in advance for the user to select. The user sets the shooting stop parameter P1, the rotation direction information, and the zoom information through the operation interface 40. The control unit 160 controls the operation of the camera module 120 and the drive module 140 according to the shooting stop parameter P1, the rotation direction information, and the zoom information.

In addition, in an embodiment, the operation interface is further used to set the starting angle information. In an embodiment, the operation interface provides various different starting angle options for the user to select, or the operation interface allows the user to input a required starting angle by himself. Before the camera module 120 starts shooting, the control unit 160 first controls, according to the starting angle information selected or input by the user, the drive module 140 to drive the camera module 120 to a starting angle corresponding to the starting angle information.

To sum up, the time-lapse photographic device 100 provided in the disclosure includes the environment detection module 170 so as to adjust the operation parameters of the camera module 120 according to an external environment status, thereby improving the image quality of time-lapse photography. In addition, the time-lapse photographic device 100 provided in the disclosure further includes an angle detection module 180 so as to correct the rotation angle of the camera module 120 in real time. In this way, the interestingness of the photographic content is improved by changing an angle of view of the time-lapse video, and the quality of the time-lapse video is improved.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A time-lapse photographic device, comprising:
a camera module;
a drive module, connected to the camera module and configured to drive the camera module to rotate;
an environment detection module, detecting an external environment of the time-lapse photographic device to generate an environment detection signal;
a control unit, electrically connected to the camera module, the drive module, and the environment detection module, wherein the control unit generates, according to a shooting stop parameter, a plurality of intermittent drive signals to control the drive module, and controls the camera module to shoot at intervals of the drive signals, and the control unit controls operation of at least one of the camera module and the drive module according to the environment detection signal; and
an angle detection module, electrically connected to the control unit and configured to detect a rotation angle of the camera module to generate an angle detection signal,
wherein the control unit adjusts the intervals of the drive signals according to the environment detection signal,
wherein the control unit controls the drive module to correct the rotation angle of the camera module according to the angle detection signal, and
wherein the control unit adjusts lengths of the intervals of the drive signals according to the angle detection signal.

2. The time-lapse photographic device according to claim 1, wherein during a process of correcting the rotation angle of the camera module, the control unit controls the camera module to stop shooting.

3. The time-lapse photographic device according to claim 1, wherein the environment detection signal comprises an environment brightness signal.

4. The time-lapse photographic device according to claim 1, wherein the environment detection signal comprises a vibration signal.

5. The time-lapse photographic device according to claim 1, wherein the drive module drives the camera module to rotate back and forth along an axial direction.

6. The time-lapse photographic device according to claim 1, further comprising an operation interface, configured to receive rotation direction information, wherein during a shooting process of the camera module, the control unit controls the drive module to drive the camera module to rotate according to the rotation direction information.

7. The time-lapse photographic device according to claim 1, further comprising an operation interface, configured to receive starting angle information, wherein before the camera module shoots, the control unit controls, according to the starting angle information, the drive module to drive the camera module to a starting angle corresponding to the starting angle information.

8. The time-lapse photographic device according to claim 1, further comprising an operation interface, configured to receive zoom information, wherein during a shooting process of the camera module, the control unit adjusts a field of view of the camera module according to the zoom information.

* * * * *